Patented Apr. 24, 1934

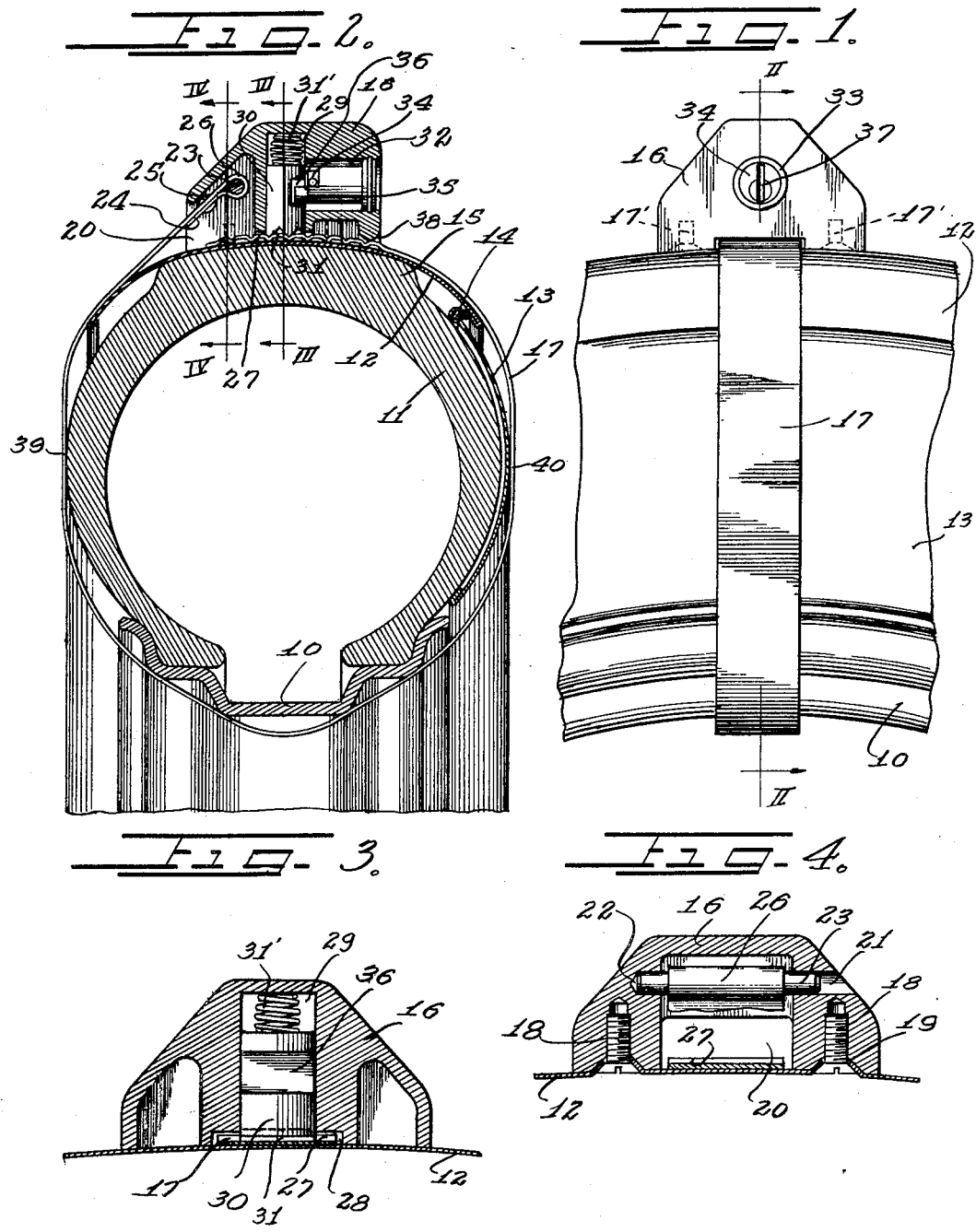

1,956,181

UNITED STATES PATENT OFFICE 1,956,181

TIRE COVER LOCK

Frederick A. Smith, North Chicago, Ill., assignor, by mesne assignments, to Lyon Cover Company, Detroit, Mich., a corporation of Michigan Application May 2, 1931, Serial No. 534,561

1 Claim. (Cl. 150—54)

My invention relates to improved locking means and arrangement for preventing theft of tire covers from spare tires or spare wheels.

An important object of the invention is to provide a simple lock structure in the form of a metal band to be applied transversely to a spare wheel or a spare tire structure to surround the tire and its supporting rim and the tire cover, with the cover forming a support to which the lock band structure is secured at one of its ends.

A further object of the invention is to provide a band lock structure having a lock housing at one end for receiving and retaining the other end of the band, with the lock housing secured to the tire cover.

A still further object is to provide a lock structure for surrounding a tire and its cover, in which the lock housing is secured to the cover with the cover forming an enclosing wall for the lock housing.

Another object is to provide an arrangement in which a lock housing is secured on a tire cover and said cover forms the bottom wall of the housing and defines with the housing a passageway for receiving the free ends of the locking band which at its other end is anchored to the housing, together with means in the housing for detachably locking the free end of the band therein.

The above enumerated and other features of my invention are incorporated in the structure disclosed on the drawing, in which drawing Figure 1 is a side elevation of a section of a tire structure with my improved lock applied thereto;

Figure 2 is a section on plane II—II of Figure 1;

Figure 3 is a section on plane III—III of Figure 2; and

Figure 4 is a section on plane IV—IV of Figure 2.

On the drawing, 10 indicates a rim which may be the rim of a wheel or a tire rim for supporting a rubber tire 11. The tire cover structure shown comprises the resilient metallic ring member 12 for surrounding the tread part of the tire, and the annular side plate 13 for engaging the outer side of the tire, the side plate having secured thereto an annular rubber bead 14 engageable by the adjacent peripheral section of the ring 12. The ring 12, by reason of its resilience, tightly grips the tread section 15 of the tire and also the rubber bead 14 on the side plate, thereby maintaining itself and the plate securely upon the tire and preventing rattling or dislodgment of the parts.

The lock structure shown for locking the cover structure to the tire comprises a lock structure 16 and a band 17. The lock structure comprises a housing or frame which may be in the form of a die casting, and the band 17 may be an elastic steel band.

As shown in Figures 3 and 4, the lock housing is of generally frusto-conical shape in transverse section and has its lower end longitudinally concave so as to seat accurately against the convex outer side of the cover structure ring 12 on which the housing is mounted to extend transversely thereof, as shown in Figure 2. Front and rear screws 17' and 18 respectively extend through openings 19 in the cover ring 12 and thread into the lock housing to firmly secure it to the cover ring. The metal surrounding the screw holes 19 is preferably deflected outwardly to form countersunk seats for the heads of the screws, as clearly shown in Figure 4, so that the screw heads will not chafe the tire when the cover structure is applied thereto.

In its rear part the lock housing has a space 20 which is open at the rear and at the bottom, the tire cover ring 12 forming a closure for the bottom end of this space. One of the side walls for the space 20 has the hole 21 extending therethrough and the opposite wall has the blind hole 22 therein in axial alignment with the hole 21. These holes receive a pivot or hinge pin 23 which is driven to engage with a tight fit in the holes, the pin being of a length so that when driven into place its outer end is well within the outer end of the hole 21 so as to prevent application of a tool for the purpose of removing the pin. The rear end of the locking band 17 has its end 24 bent back and secured by a rivet 25 in order to form a loop 26 for receiving the pin 23. The looped end of the band is first projected into the space 20 and then the pin is inserted through the loop and driven into position in the holes 21 and 22, the band being thus hinged to the lock housing.

The outer end of the band 17 is corrugated or serrated to provide transverse locking ridges or teeth 27. In its underside the lock housing has the longitudinally extending rectangular slot or channel 28 for which the cover ring 12 forms the bottom closure when the housing is secured to the ring. This slot or passageway extends forwardly to the exterior at the front of the housing and communicates at its rear end with the space 20. The slot or passageway is of a height sufficient to permit insertion therethrough of the corrugated or toothed end of the band 17, as shown in Figure 2.

The lock housing has the vertical cylindrical pocket 29 extending upwardly therein within a short distance of the top of the housing and opening at its lower end into the passageway 28. Within this pocket is the lock plunger or bolt 30 which at its lower end has teeth 31 complementary to the teeth or ridges 27 and for engaging therewith to lock the end of the band 17 against withdrawal from the passageway 28 after insertion therein. A compression spring 31' is interposed between the upper end of the lock bolt and the adjacent wall of the housing and tends to keep the bolt projected with its teeth in interlocking engagement with the band teeth.

In the front part of the lock housing is the horizontal cylindrical passageway 32 in which a lock barrel 33 is secured. The passageway 32 opens into the pocket 29 and the lock cylinder 34 within the lock barrel has the eccentric or cam extension 35 which projects into the transverse notch 36 of the lock bolt 30. The lock cylinder may be turned by a suitable key inserted in the key hole 37.

After the spare wheel or the spare tire structure is mounted on its support, the cover structure 12, 13, is applied to the tire. The lock housing is secured to the ring 12 preferably at a central point so that it will be at the top of the wheel or tire when the cover is applied to the tire. In the case of a spare wheel, the band 17 is looped around the wheel rim and tire between adjacent wheel spokes. Where a spare tire structure, i. e., a tire and its supporting rim are mounted on a carrier, the band 17 is extended to surround the carrier ring as well as the tire and its rim. The corrugated or toothed end of the band is then slipped into and through the passageway 28, the spring actuated lock bolt yielding to permit such insertion. The toothed lock bolt functions like a detent pawl to permit insertion of the toothed end of the band and to then interlock its teeth with the teeth of the band to lock the band against withdrawal. As a further safeguard, the lock cylinder is turned by the key to swing its cam end 35 to its lowermost position just above the lower wall of the slot 36 and the lock bolt will then be positively locked with its teeth in interlocking engagement with the band teeth. When it is desired to unlock the band, the key is turned to engage the cam end of the lock cylinder with the upper wall of the lock bolt slot 36 so that the bolt will be raised sufficiently against the pressure of the spring 31' to permit withdrawal of the toothed end of the band 17. The cam end 35 cooperates with the rear wall of the bolt slot 36 to prevent turning of the bolt and to keep its teeth in proper alignment with the band teeth.

The outer edge of the lock housing above the passageway 28 is beveled or rounded as indicated at 38 in Figure 1 so as to facilitate insertion of the toothed end of the band 17. The band end is inserted a sufficient distance to draw the band directly up against the tire structure and the cover parts therefor. The band is preferably of steel and is preferably formed with the flat sections 39 and 40 which, when the band has been fully applied in locking position, engage along the diametrically opposite sides of the tire, the section 40 bearing against the side plate 13 of the cover structure. Near its hinged end the band will engage for a distance with the inner peripheral section of the cover ring 12 and the end of the band beyond the flat section 40 will intimately engage against the outer section of the ring 12 as clearly shown in Figure 2. Such engagement of the band with the cover structure parts will assist in holding such parts in proper position on the tire and prevent displacement or rattling thereof. The ring 12 also forms an inclined approach to the passageway 28 for the toothed end of the band 17 so that with the rounded corner 38 of the lock housing the band end may be quickly and accurately inserted into the passageway for interlocking engagement with the lock bolt.

By having the lock housing at the top of the cover and the protected tire, all the operating parts of the lock structure are fully protected and shielded from the weather and furthermore such location of the lock structure gives a pleasing and ornamental appearance to the tire and cover assembly.

I have shown a practical and efficient embodiment of the various features of my invention, but I do not desire to be limited to the exact details of construction or arrangement shown as changes and modifications may be made without departing from the scope of the invention as defined by the appended claims.

I claim as follows:

The combination with a spare tire cover including a ring formed to be fitted over the tread of the tire of a lock structure for locking the cover to the tire including a housing secured to said ring and having fastened to it one end of a band looped transversely around said cover and tire for locking them together.

FREDERICK A. SMITH.